(12) United States Patent
Shibayama et al.

(10) Patent No.: US 10,839,995 B2
(45) Date of Patent: Nov. 17, 2020

(54) FERRITE COMPOSITION AND MULTILAYER ELECTRONIC COMPONENT

(71) Applicant: TDK CORPORATION, Tokyo (JP)

(72) Inventors: Takeshi Shibayama, Tokyo (JP); Yukio Takahashi, Tokyo (JP); Tatsuro Suzuki, Tokyo (JP); Hiroyuki Tanoue, Tokyo (JP); Yasuhiro Ito, Tokyo (JP); Takahiro Sato, Tokyo (JP); Takashi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/423,760

(22) Filed: May 28, 2019

(65) Prior Publication Data
US 2019/0362872 A1 Nov. 28, 2019

(30) Foreign Application Priority Data
May 28, 2018 (JP) .................. 2018-101762

(51) Int. Cl.
*H01F 1/34* (2006.01)
*C04B 35/26* (2006.01)
(Continued)

(52) U.S. Cl.
CPC ............. *H01F 1/344* (2013.01); *B32B 9/005* (2013.01); *C04B 35/265* (2013.01); *C04B 35/6262* (2013.01); *C04B 35/62625* (2013.01); *C04B 35/62695* (2013.01); *C04B 35/63416* (2013.01); *C04B 35/64* (2013.01); *B32B 2457/00* (2013.01); *C04B 2235/3274* (2013.01); *C04B 2235/3277* (2013.01); *C04B 2235/3298* (2013.01); *C04B 2235/3418* (2013.01); *C04B 2235/5436* (2013.01); *C04B 2235/602* (2013.01); *C04B 2235/606* (2013.01);
(Continued)

(58) Field of Classification Search
CPC ....... H01F 1/344; B32B 9/005; C04B 35/265; C04B 35/62625; C04B 35/62695; C04B 35/64
USPC ........................................... 428/702
See application file for complete search history.

(56) References Cited

U.S. PATENT DOCUMENTS

| 2010/0163779 A1 | 7/2010 | Okano et al. |
| 2015/0097137 A1* | 4/2015 | Wada .................. H01F 1/01 252/62.6 |
| 2016/0300651 A1* | 10/2016 | Choto ................. H01F 1/344 |

FOREIGN PATENT DOCUMENTS

| JP | H08-325056 A | 12/1996 |
| JP | 2008-290931 A | 12/2008 |

(Continued)

*Primary Examiner* — Humera N. Sheikh
*Assistant Examiner* — Katherine A Christy
(74) *Attorney, Agent, or Firm* — Oliff PLC

(57) ABSTRACT

A ferrite composition includes a main component that includes more than 44.0 mol % to 50.0 mol % or less of an Fe compound, 5.5 to 14.0 mol % of a Cu compound, 4.0 to 39.0 mol % of a Zn compound, and a balance of less than 40.0 mol % of a Ni compound. The ferrite composition further includes a subcomponent that includes, with respect to 100 parts by weight of the main component, more than 3.0 parts by weight to 13.0 parts by weight or less of an Si compound, more than 2.0 parts by weight to 10.0 parts by weight or less of a Co compound, and 0.25 to 5.00 parts by weight of a Bi compound. A weight ratio of the content of the Co compound to the content of the Si compound is 0.4 to 2.9.

17 Claims, 6 Drawing Sheets

(51) Int. Cl.
　　　*C04B 35/626*　　　(2006.01)
　　　*C04B 35/634*　　　(2006.01)
　　　*C04B 35/64*　　　(2006.01)
　　　*B32B 9/00*　　　(2006.01)
　　　*H01F 41/06*　　　(2016.01)
(52) U.S. Cl.
　　　CPC .. *C04B 2235/6567* (2013.01); *C04B 2235/85* (2013.01); *H01F 41/06* (2013.01)

(56) References Cited

FOREIGN PATENT DOCUMENTS

| | | |
|---|---|---|
| JP | 2013-060332 A | 4/2013 |
| JP | 5582279 B2 | 9/2014 |
| JP | 2016-196397 A | 11/2016 |

* cited by examiner

FERRITE COMPOSITION AND MULTILAYER ELECTRONIC COMPONENT

BACKGROUND OF THE INVENTION

The invention relates to a ferrite composition and a multilayer electronic component.

In recent years, with an adoption of NFC technology, contactless power supply, etc. to ICT devices, the increase in alternating current flowing in the circuits of ICT devices has progressed. And noise removal products corresponding to the large currents are required.

Winding type ferrite inductors and multilayer type ferrite inductors may be exemplified as the noise removal products, however, in high current usage environments as described above, the winding type ferrite inductors are used because of their high noise removal properties. However, even in the multilayer type ferrite inductors, noise removal properties equal to or higher than those of the winding type ferrite inductors are required.

Below Patent Document 1 and Patent Document 2 describe the ferrite composition and the multilayer electronic component having excellent properties by controlling their composition.

[Patent Document 1] Japanese Patent No. 5582279
[Patent Document 2] Japanese Unexamined Patent Application Publication No. 2013-060332

BRIEF SUMMARY OF INVENTION

However, at present, ferrite compositions and multilayer electronic components having further excellent properties are required.

The present invention has been made in view of such situations, and an object of the invention is to obtain such as a ferrite composition having improved inductance properties, etc.

In order to achieve the above object, the ferrite composition according to the invention includes a main component and a subcomponent, wherein the main component includes more than 44.0 mol % to 50.0 mol % or less of an Fe compound in terms of $Fe_2O_3$, 5.5 mol % or more to 14.0 mol % or less of a Cu compound in terms of CuO, 4.0 mol % or more to 39.0 mol % or less of a Zn compound in terms of ZnO, and a balance which is less than 40.0 mol % of a Ni compound in terms of NiO, the subcomponent, with respect to 100 parts by weight of the main component, includes more than 3.0 parts by weight to 13.0 parts by weight or less of an Si compound in terms of $SiO_2$, more than 2.0 parts by weight to 10.0 parts by weight or less of a Co compound in terms of $Co_3O_4$, and 0.25 parts by weight or more to 5.00 parts by weight or less of a Bi compound in terms of $Bi_2O_3$, and a weight ratio of (the content of the Co compound in terms of $Co_3O_4$)/(the content of the Si compound in terms of $SiO_2$) is 0.4 to 2.9.

The ferrite composition of the invention has the above-mentioned properties, so that the inductance properties is improved, the resistivity and the initial permeability μi are high, and the DC bias properties and the alternating current resistance also become excellent.

The ferrite composition of the invention may include 3.0 parts by weight or more to 8.0 parts by weight or less of the Co compound in terms of $Co_3O_4$.

The ferrite composition of the invention may include 1.00 parts by weight or more to 4.00 parts by weight or less of the Bi compound in terms of $Bi_2O_3$.

The ferrite composition of the invention, wherein the weight ratio of (the content of the Co compound in terms of $Co_3O_4$)/(the content of the Si compound in terms of $SiO_2$) may be 1.0 or more to 2.5 or less.

The ferrite composition of the invention may include
a main phase including a spinel ferrite,
a first subphase including a $Zn_2SiO_4$ phase, and
a grain boundary phase including an $SiO_2$ phase.

The ferrite composition of the invention may further include
a second subphase including an $SiO_2$ phase.

The ferrite composition of the invention, wherein
an area of the first subphase may be 1% or more and 32% or less,
an area of the second subphase may be 1% or more and 16% or less,
an area of the main phase may be 66% or more and 82% or less, and
an area of the grain boundary phase may be 1% or more and 15% or less,
when a total area of the main phase, the subphase, and the grain boundary phase is 100%.

A multilayer electronic component composed by laminating a coil conductor and a ceramic layer, wherein
the ceramic layer may include the ferrite composition described above.

Since the ceramic layer includes the ferrite composition described above, despite being the multilayer type coil component, it is possible to exhibit the same or higher noise removal properties as compared with the winding type coil component.

DETAILED DESCRIPTION OF INVENTION

Figure 1:
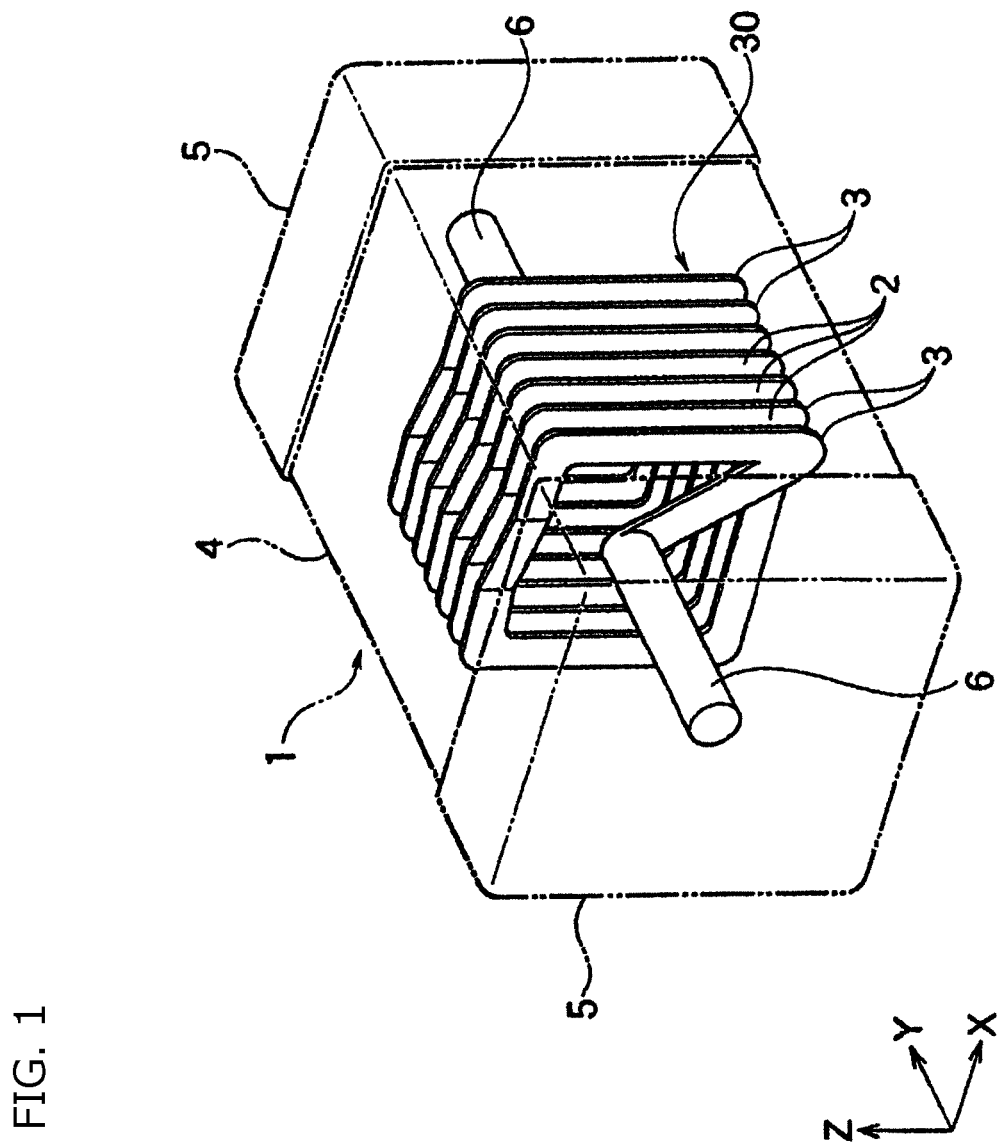
FIG. 1 is an internal perspective view of a multilayer chip coil as an electronic component according to an embodiment of the invention.

Hereinafter, the invention will be described based on embodiments shown in the drawings. As shown in FIG. 1, a multilayer chip coil 1 as an electronic component according to an embodiment of the invention has a chip body 4 in which ceramic layers 2 and internal electrode layers 3 are alternately laminated in the Y-axis direction.

Each internal electrode layer 3 has a square ring shape, a C shape or an U shape, and is connected in a spiral shape by a through hole electrode (not shown) or a step-formed electrode, those penetrate the adjacent ceramic layer 2 for the internal electrode connection. This configures the coil conductor 30.

Terminal electrodes 5, 5 are formed on both ends of the chip body 4 in the Y-axis direction. Each terminal electrode 5 is connected to an end of the through hole electrode 6 for the terminal electrode connection, which penetrates the multilayer ceramic layer 2. Each terminal electrode 5, 5 is connected to both ends of the coil conductor 30, which constitutes a closed magnetic circuit coil (winding pattern).

In the embodiment, the laminating direction of the ceramic layer 2 and the internal electrode layer 3 coincides with the Y-axis, and the end faces of the terminal electrodes 5, 5 are parallel to the X-axis and the Z-axis. The X, Y and Z axes are perpendicular to one another. In the multilayer chip coil 1 shown in FIG. 1, the winding axis of the coil conductor 30 substantially coincides with the Y-axis.

The outer shape and size of the chip body 4 are not particularly limited, and can be set appropriately according to the application thereof. Usually, the outer shape is substantially rectangular, for example, the X-axis size is 0.15 to 0.8 mm, the Y-axis size is 0.3 to 1.6 mm, and the Z-axis size is 0.1 to 1.0 mm.

The thickness between the electrodes and the thickness of the base according to the ceramic layer 2 are not particularly limited. The thickness between the electrodes (the distance between the internal electrode layers 3 and 3) can be set to about 3 to 50 µm, and the thickness of the base (a length of the through hole electrode 6 for terminal connection in the Y-axis direction) can be set to about 5 to 300 µm.

In the embodiment, the terminal electrode 5 is not particularly limited, and is formed by depositing a conductive paste mainly including Ag, Pd, etc. on the outer surface of the main body 4, baking thereof, and followed by electroplating thereof. Cu, Ni, Sn, etc. can be used for the electroplating.

The coil conductor 30 includes Ag (including an alloy of Ag), and is made of such as an Ag alone, an Ag—Pd alloy, etc. Zr, Fe, Mn, Ti, and their oxides can be included as subcomponents of the coil conductor.

The ceramic layer 2 includes the ferrite composition according to an embodiment of the invention. Hereinafter, the ferrite composition will be described in detail.

The ferrite composition according to the embodiment includes an Fe compound, a Cu compound, a Zn compound, and an Ni compound as main components. The Fe compound may include such as $Fe_2O_3$. The Cu compound may include such as CuO. The Zn compound may include such as ZnO. The Ni compound may include such as NiO.

The content of the Fe compound in terms of $Fe_2O_3$ is more than 44.0 mol % to 50.0 mol % or less, preferably 44.1 mol % or more to 49.2 mol % or less, with respect to 100 mol % of the main component. When the content of Fe compound is large, the DC bias properties and the resistivity tend to lower. In addition, it is difficult to obtain sufficient sinterability, and in particular, the density tends to decrease when sintering at a low temperature. Furthermore, AC resistance tends to be high. When the content of the Fe compound is small, the initial permeability µi tends to decrease.

The content of the Cu compound in terms of CuO is 5.5 mol % or more to 14.0 mol % or less, preferably 6.0 mol % or more to 9.0 mol % or less, with respect to 100 mol % of the main component. When the content of Cu compound is large, the DC bias properties tend to be low. In addition, the AC resistance tends to be high, and the resistivity tends to be low. When the content of Cu compound is small, the sinterability deteriorates, and in particular, the sintering density at the time of low temperature sintering tends to be reduced. In addition, the resistivity tends to decrease due to the deterioration of the sinterability. Furthermore, the initial permeability µi is also likely to decrease.

The content of the Zn compound in terms of ZnO is 4.0 mol % or more to 39.0 mol % or less, preferably 4.5 mol % or more to 25.0 mol % or less, with respect to 100 mol % of the main component. When the content of Zn compound is large, the DC bias properties tend to be low. When the content of Zn compound is small, the initial permeability µi tends to be low. In addition, the sinterability deteriorates, and in particular, the sintering density at the time of low temperature sintering tends to decrease.

The balance of the main component includes the Ni compound. The content of the Ni compound in terms of NiO is less than 40.0 mol %, preferably 4.5 mol % or more to 39.9 mol % or less, with respect to 100 mol % of the main component. When the content of Ni compound is large, the initial permeability µi tends to be low and the density at the time of low temperature sintering tends to decrease.

The ferrite composition according to the embodiment includes, Si compound, Co compound, and Bi compound as subcomponents in addition to the above main components.

The content of Si compound in terms of $SiO_2$ is more than 3.0 parts by weight to 13.0 parts by weight or less, preferably 5.0 parts by weight or more to 8.0 parts by weight or less, with respect to 100 parts by weight of the main component. When the content of the Si compound is large, the sinterability deteriorates and the initial permeability µi tends to be lowered. When the content of the Si compound is small, the DC bias properties tend to be low and AC resistance tends to be high.

The content of Co compound in terms of $Co_3O_4$ is more than 2.0 parts by weight to 10.0 parts by weight or less, preferably 3.0 parts by weight or more to 8.0 parts by weight or less, with respect to 100 parts by weight of the main component. When the content of the Co compound is large, the initial permeability µi tends to be lowered. When the content of Co compound is small, the DC bias properties tend to be lowered and AC resistance tends to be high. Furthermore, the Co compound has the effect of suppressing the decrease in Q value for a high amplitude current.

The content of Bi compound in terms of $Bi_2O_3$ is 0.25 parts by weight or more to 5.00 parts by weight or less, preferably 1.00 parts by weight or more to 4.00 parts by weight or less, with respect to 100 parts by weight of the main component. When the content of the Bi compound is large, the resistivity tends to be low. In addition, the DC bias properties are likely to be low, and the AC resistance is likely to be high. When the content of the Bi compound is small, the resistivity tends to be low. In addition, it is difficult to obtain sufficient sinterability, and in particular, the density at low temperature sintering tends to decrease. The Bi compound also has the function of promoting the formation of $Zn_2SiO_4$ during the sintering process. And in particular, the effect of promoting the formation of $Zn_2SiO_4$ becomes large when adding the bismuth oxide during pulverization of the calcined material.

The content of Co compound in terms of $Co_3O_4$/the content of Si compound in terms of $SiO_2$, hereinafter simply referred to as "Co/Si", is 0.4 to 2.9, preferably 1.0 to 2.5 in weight ratio. Even if the content of the Co compound and the content of the Si compound are in the above ranges, the initial permeability µi tends to decrease when "Co/Si" is excessively high. The AC resistance: Rac tends to be high or the density tends to decrease when "Co/Si" is excessively low.

The content of each main component and each subcomponent does not substantially change in each process during producing the ferrite composition, from the raw material powder to after firing.

According to the ferrite composition of the embodiment, in addition to the fact that the composition range of the main component is controlled to the above range, the Si compound, the Co compound and the Bi compound within the above ranges are included as the subcomponents. As a result, it is possible to obtain a ferrite composition having an excellent sinterability, a high resistivity, a high initial permeability μi, excellent DC bias properties, and an excellent AC resistance. In addition, the ferrite composition of the invention can be sintered at about 900° C., which is the same or lower than the melting point of Ag used as the internal electrode. Therefore, applications to various uses become possible.

Further, the ferrite composition of the embodiment further includes additional components of manganese oxide such as $Mn_3O_4$, zirconium oxide, tin oxide, magnesium oxide, a glass compound, etc., apart from the above-mentioned subcomponents, in the ranges which do not inhibit the effects of the invention. The contents of these additional components are not particularly limited, and for example, about 0.05 to 1.0 parts by weight with respect to 100 parts by weight of the main component.

In particular, the magnesium oxide content is preferably 0.5 parts by weight or less, including zero part by weight. By setting the magnesium oxide content to 0.5 parts by weight or less, the reaction between MgO and $SiO_2$ is suppressed, and a first subphase including a latter mentioned $Zn_2SiO_4$ phase is easily formed.

Furthermore, the ferrite composition of the embodiment may include an oxide of an inevitable impurity element.

Specifically, C, S, Cl, As, Se, Br, Te and I, typical metal elements such as Li, Na, Mg, Al, Ca, Ga, Ge, Sr, Cd, In, Sb, Ba, Pb, etc., and transition metal elements such as Sc, Ti, V, Cr, Y, Nb, Mo, Pd, Ag, Hf, Ta, etc. are exemplified as the inevitable impurity elements. In addition, the oxides of the inevitable impurity elements may be included in the ferrite composition if it is approximately 0.05 parts by weight or less.

In particular, by setting Al content in terms of $Al_2O_3$ to 0.05 parts by weight or less, with respect to 100 parts by weight of the main component, the sinterability and the resistivity can be easily improved.

Figure 3A:
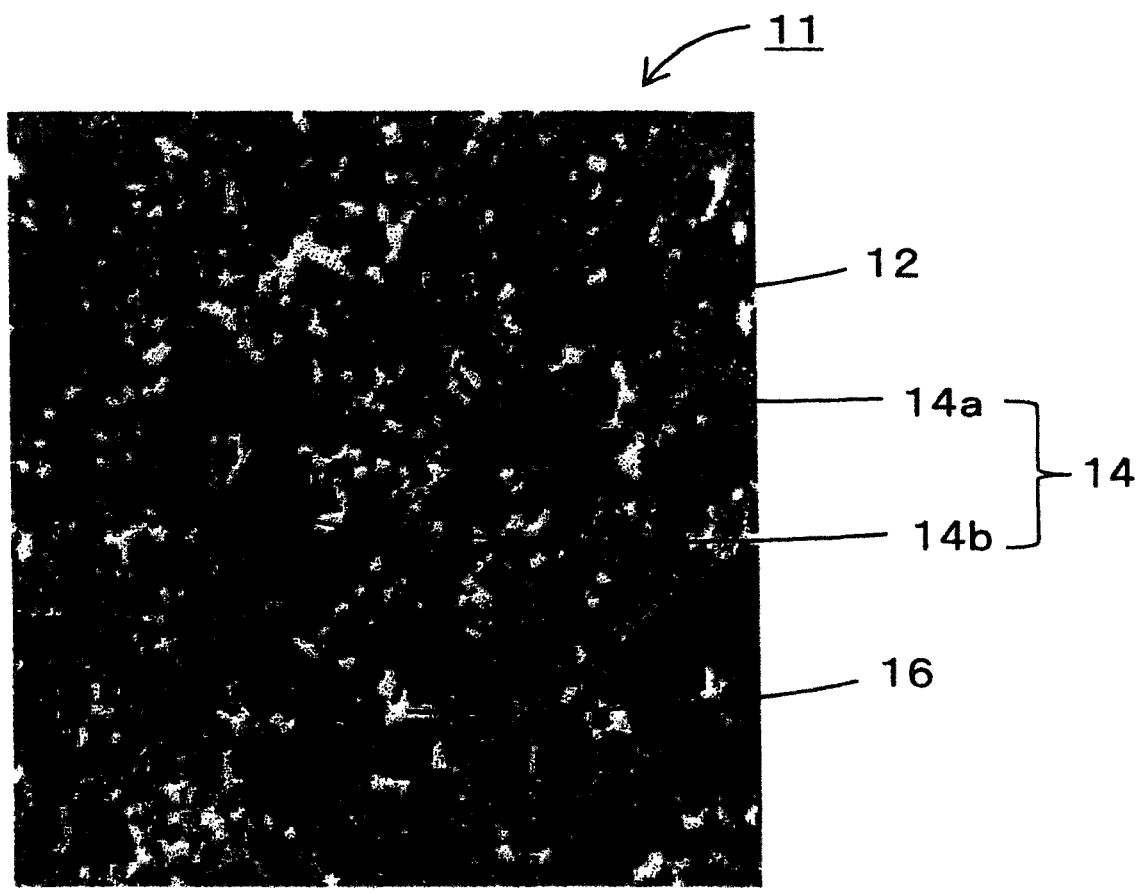
FIG. 3A is an EPMA image of a ferrite composition according to the invention.
Figure 3B:
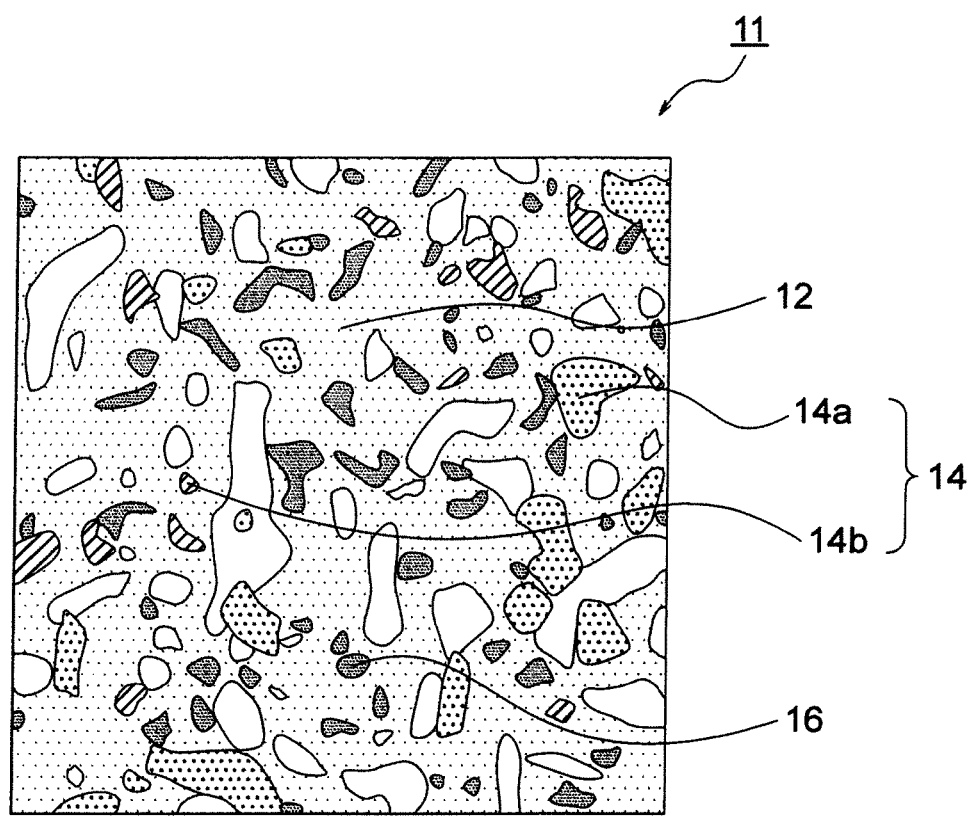
FIG. 3B is a schematic view of the ferrite composition according to the invention.

The ferrite composition according to the embodiment preferably has the above composition, and preferably has a composite structure as shown in FIGS. 3A and 3B.

FIG. 3A is the ferrite composition 11 (the latter mentioned No. 5) according to the embodiment observed by STEM-EDS at a magnification of 20000. FIG. 3B is a schematic view of FIG. 3A. The preferred ferrite composition 11 includes the first subphase 14a including $Zn_2SiO_4$ phase and the second subphase 14b including $SiO_2$ phase, in addition to the main phase 12 including the spinel ferrite. Furthermore, the preferred ferrite composition 11 includes the grain boundary phase 16 including $SiO_2$ phase between the main phase 12, the first subphase 14a, and the second subphase 14b. The second subphase 14b including the $SiO_2$ phase may not be included but is preferably included. The first subphase 14a may include other elements such as Ni, Cu, Co, etc., and the elements may be dissolved in $Zn_2SiO_4$. The second subphase 14b may include, for example, the other elements such as Fe and Ni. In addition to $SiO_2$, the grain boundary phase 16 includes more $Bi_2O_3$ than the main phase 12. The distinction between the second subphase 14b and the grain boundary phase 16 in FIGS. 3A and 3B is provisionally made. Specifically, it is determined the second subphase 14b when the content ratio of $SiO_2$ is larger than the content ratio of $Bi_2O_3$ in mole ratio, while it is determined the grain boundary phase 16 when the content ratio of $SiO_2$ is the same with or less than the content ratio of $Bi_2O_3$ in mole ratio. The accurate distinction can be made by an observation using STEM-EDS having a higher magnification described later.

The first subphase 14a including $Zn_2SiO_4$ phase, the second subphase 14b including $SiO_2$ phase, and the grain boundary phase 16 including $SiO_2$ phase have smaller thermal expansion coefficient in relative to the same of the main phase 12 including the spinel ferrite. Therefore, each phase having the small thermal expansion coefficient applies a tensile stress to the main phase 12 having the large thermal expansion coefficient. By applying the tensile stress, the inductance property of the coil component using the ferrite composition 11 is improved.

Further, the ratio of the subphase 14 to the total of the main phase 12, the subphase 14 having the different composition from the main phase 12, and the grain boundary phase 16 in the ferrite composition 11 according to the embodiment is larger than the same in the conventional ferrite composition. Specifically, in the STEM-EDS image having a magnification of 20,000 or more and at which the main phase 12 can be observed, the total area of the subphase 14 is preferably 5% or more and 33% or less, when the total area of the main phase 12, the subphase 14, and the grain boundary phase 16 is 100%. When the total area of the subphase 14 is 5% or more, the above-mentioned tensile stress is sufficiently applied. By applying a sufficient tensile stress, the coil component made of the ferrite composition 11 has improved inductance properties, a high resistivity, a high initial permeability μi, excellent DC bias properties and an excellent AC resistance. The area of the first subphase 14a is preferably 1% or more to 32% or less, and the area of the second subphase 14b is preferably 1% or more to 16% or less. The area of the main phase 12 is preferably 66% or more to 82% or less, and the area of the grain boundary phase 16 is preferably 1% or more to 15% or less.

Further, in the embodiment, the $Zn_2SiO_4$ phase refers to a phase including $Zn_2SiO_4$. The $SiO_2$ phase refers to a phase in which the content ratio of $SiO_2$ is higher than that of the main phase. The $Bi_2O_3$ phase refers to a phase in which the content ratio of $Bi_2O_3$ is higher than that of the main phase. In addition, as described later, there may be a phase including a $SiO_2$ phase and a $Bi_2O_3$ phase.

Figure 4:
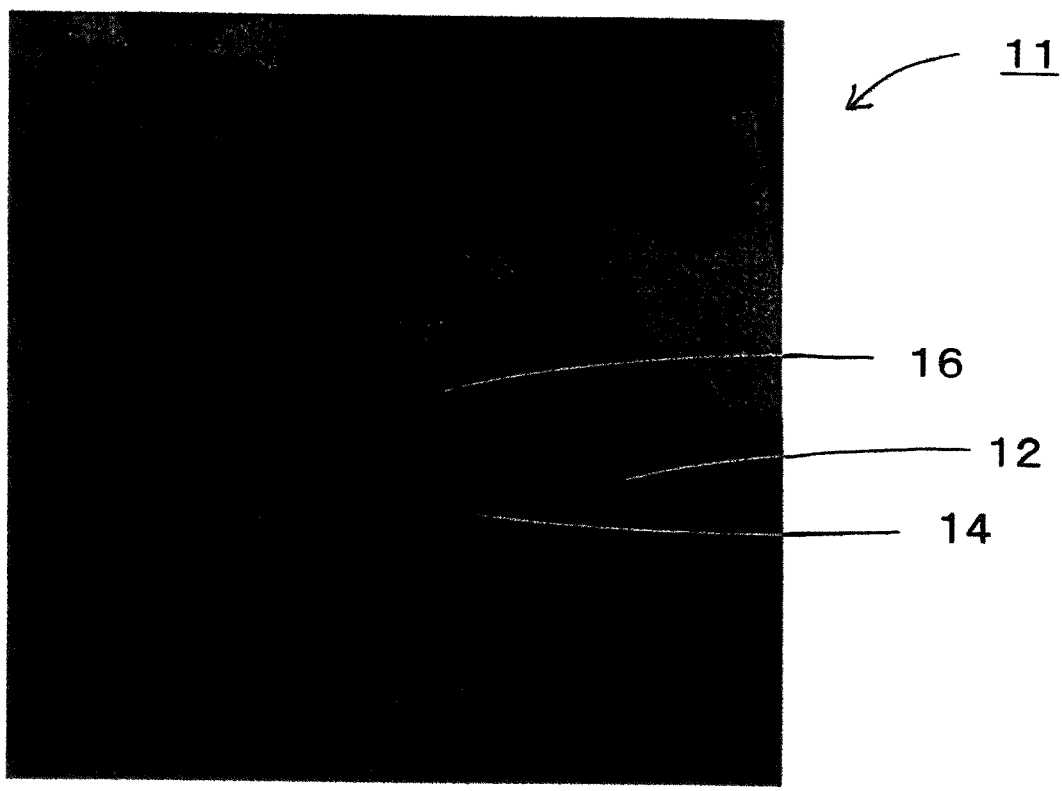
FIG. 4 is an Si elemental mapping image of the ferrite composition according to the invention.
Figure 5:
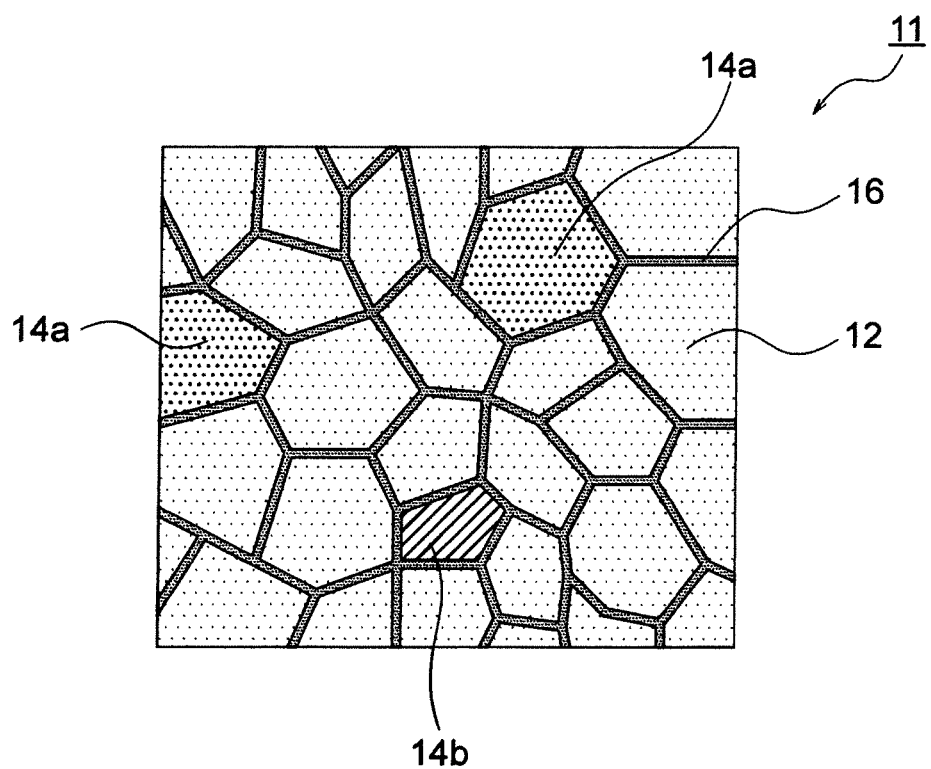
FIG. 5 is a schematic view of a ferrite composition according to the invention.

Further, FIG. 4 is an Si elemental mapping image obtained using STEM-EDS by a magnification of 100,000 times for the ferrite composition 11 (No. 5) according to the embodiment. FIG. 5 is a schematic view of FIG. 4.

It can be confirmed by any method as to define whether the subphase 14 of FIGS. 4 and 5 are the first subphase 14a or the second subphase 14b. For example, an Zn elemental mapping is mentioned.

From FIGS. 4 and 5 in which the observation magnification is increased in relative to FIGS. 3A and 3B, it can be realized that the grain boundary phase 16 including $SiO_2$ phase exists between the respective phases of the main phase 12, the first subphase 14a, and the second subphase 14b, and a core-shell structure in which a core of the main phase or the subphase is covered with a shell including $SiO_2$.

As described above, the grain boundary phase 16 also includes $Bi_2O_3$. The grain boundary phase 16 can be confirmed to be the $Bi_2O_3$ phase and the $SiO_2$ phase, by such as a line analysis of a part passing through the main phase 12 and the grain boundary phase 16 using STEM-EDS.

Since the ferrite composition 11 according to the embodiment includes the grain boundary phase 16 including the $SiO_2$ phase, the ratio of the grain boundary phase 16 becomes larger than the ratio of the grain boundary phase 16 in the conventional ferrite composition. This means that the thickness of the grain boundary phase 16 is thicker than that of the conventional ferrite composition. Then, by including the grain boundary phase 16 including the $SiO_2$ phase having a thermal expansion coefficient different from that of the main phase, a tensile stress is applied from the grain boundary phase 16 to each phase by covering the each phase. When the tensile stress is sufficiently applied, the ferrite composition 11 has improved inductance properties, and shows a high resistivity, a high initial permeability µi, excellent DC bias properties and an excellent AC resistance. According to the embodiment, in the STEM-EDS image in which the main phase 12 at a magnification of 20,000 or more, the area of the grain boundary phase 16 is preferably 1% or more to 15% or less when the total area of the main phase 12, the subphase 14 having the thermal expansion coefficient different from that of the main phase, and the grain boundary phase 16 is 100%.

In the ferrite composition 11 according to the embodiment, the average crystal grain size is preferably 0.2 to 1.5 µm, when each of the main phase 12 and the sub phase 14 is a crystal grain. The method of measuring the average crystal grain size is arbitrary. For example, the size can be measured using XRD.

Furthermore, the presence of the $Zn_2SiO_4$ phase can be confirmed by an X-ray diffraction as well as an elemental analysis by the above-mentioned EPMA or STEM-ED S.

Hereinafter, the definition and the measurement method of the $Zn_2SiO_4$ content will be described.

An X-ray diffraction intensity of the ferrite composition was measured by an X-ray diffractometer, and the peak intensity $I_A$ of a spinel type ferrite (311) plane and the peak intensity $I_B$ of a (113) plane in $Zn_2SiO_4$ were measured. The content of $Zn_2SiO_4$ phase is a value (IB/IA) obtained by dividing IB by IA. The value obtained by subtracting the background from the intensity indicated by the X-ray diffractometer is referred to as the X-ray diffraction intensity.

The content ($I_B/I_A$) of $Zn_2SiO_4$ is preferably 0.006 or more. Further, the upper limit of the content of $Zn_2SiO_4$ is not particularly limited, but $I_B/I_A$ is preferably 0.200 or less.

Next, an example of the method for producing the ferrite composition according to the embodiment will be described. First, starting raw materials (raw materials of the main component and of the subcomponents) are weighed so as to have a predetermined composition ratio. It is preferable to use the starting raw material having the average grain size of 0.05 to 1.0 µm.

Iron oxide ($\alpha$-$Fe_2O_3$), copper oxide (CuO), nickel oxide (NiO), zinc oxide (ZnO), composite oxides, etc. can be used as the raw materials of the main component. Examples of the composite oxide include zinc silicate ($Zn_2SiO_4$). In addition, various compounds which become the above-described oxides or composite oxides by firing can be used. In addition, various compounds which become the above-mentioned oxides or composite oxides by firing can be exemplified. The compound which becomes the above-described oxides by firing exemplifies a metal simple substance, a carbonate, an oxalate, a nitrate, a hydroxide, a halide, an organic metal compound etc.

Silicon oxide, bismuth oxide and cobalt oxide can be used as the raw materials of the subcomponents. The oxides used as the raw materials of the subcomponents are not particularly limited, and complex oxides etc. can be used. Examples of the composite oxide include zinc silicate ($Zn_2SiO_4$). In addition, various compounds which become the above-mentioned oxides or composite oxides by firing can be exemplified. The compound which becomes the above-described oxides by firing exemplifies a metal simple substance, a carbonate, an oxalate, a nitrate, a hydroxide, a halide, an organic metal compound etc.

Note that $Co_3O_4$ is easy to store and handle, and its valence is stable in the air, and that it is preferable as the raw material of the cobalt compound.

Next, an iron oxide, a copper oxide, a nickel oxide, and a zinc oxide, which are raw materials of the main component, are mixed to obtain a raw material mixture. Furthermore, among the raw materials of the above main components, zinc oxide may not be added at this stage, and may be added together with zinc silicate after calcination of the raw material mixture. On the other hand, a part of the raw material of the subcomponents may be mixed with the raw material of the main component at this stage. The existence ratio of the main phase, the first subphase, the second subphase, and the grain boundary phase can be controlled by appropriately controlling the type and ratio of the raw materials included in the raw material mixture and those of the raw materials added after calcination of the raw material mixture.

Specifically, the area ratio of the first subphase tends to increase as the addition amount of $Zn_2SiO_4$ added after calcination increases. Further, the area ratio of the second subphase tends to increase as the additional amount of $SiO_2$ added after calcination increases. Furthermore, as the content of ZnO in the raw material mixture decreases, the area ratio of the second subphase or the grain boundary phase tends to increase.

The method of mixing is arbitrary, and it may be such as a wet mixing using a ball mill or a dry mixing using a dry mixer.

Next, the raw material mixture is calcined, and obtained a calcined material. The calcination causes a thermal decomposition of the raw material, a homogenization of the components, a formation of the ferrite, a disappearance of an ultrafine powder by sintering and a grain growth to an appropriate grain size. And the raw material mixture is converted into a form suitable for the later processes. The calcination time and the calcination temperature are arbitrary. The calcination is usually performed in an atmosphere (air), but may be performed in an atmosphere having a lower oxygen partial pressure than in air.

Next, a silicon oxide, a bismuth oxide, a cobalt oxide, a zinc silicate, etc., which are raw materials of the subcomponents, are mixed with the calcined material to produce a mixed calcined material. In particular, as the amount of zinc silicate added at this stage increases, the existence ratio of the first subphase which is the $Zn_2SiO_4$ phase tends to be high. In addition, as the amount of Zn in the calcined material decreases, the existence ratio of the grain boundary phase of the $SiO_2$ phase and the $Bi_2O_3$ phase tends to increase. This is because when the amount of Zn in the calcined material is small, Zn in $Zn_2SiO_4$ easily dissolves into the main phase during firing, and $SiO_2$ is generated in the grain boundary phase. Furthermore, as the amount of silicon oxide added at this stage increases, the existence ratio of the second subphase, which is the $SiO_2$ phase, tends to increase.

Next, the mixed and calcined material is pulverized to obtain a pulverized calcined material. The pulverization is performed to break up an aggregation of the mixed calcined material into a powder having suitable sinterability. When the mixed and calcined material forms a large lump, it is roughly pulverized and then wet pulverized using a ball mill, an attritor, etc. The wet pulverization is carried out until the average grain size of the pulverized calcined material is preferably around 0.1 to 1.0 µm Hereinafter, a method for producing the laminated chip coil 1 shown in FIG. 1 using the pulverization material after the wet pulverization is described.

The multilayer chip coil 1 shown in FIG. 1 can be produced by a general producing method. That is, the chip body 4 can be formed by printing and laminating the ferrite paste, obtained by kneading the pulverized calcined material together with the binder and the solvent, and the internal electrode paste, including such as Ag, and firing thereof (a printing method). Alternatively, the chip body 4 may be formed by producing a green sheet using the ferrite paste, printing the internal electrode paste on the surface of the green sheet, and then laminating and firing thereof (a sheet method). In either method, the terminal electrode 5 may be formed by baking or plating after forming the chip body.

The content of the binder and the solvent in the ferrite paste is arbitrary. For example, the content of the binder can be set within the range of about 1 to 10 wt %, the content of the solvent can be set within the range of about 10 to 50 wt %, when the entire ferrite paste is 100 wt %. In addition, in the ferrite paste, a dispersant, a plasticizer, a dielectric, an insulator, etc. can be included in an amount of 10 wt % or less when needed. An internal electrode paste including such as Ag can also be produced in the same manner. The firing conditions and the like are not particularly limited, but when such as Ag is included in the internal electrode layer, the firing temperature is preferably 930° C. or less, more preferably 900° C. or less.

The invention is not limited to the above-described embodiment and can be variously modified within the scope of the invention.

Figure 2:
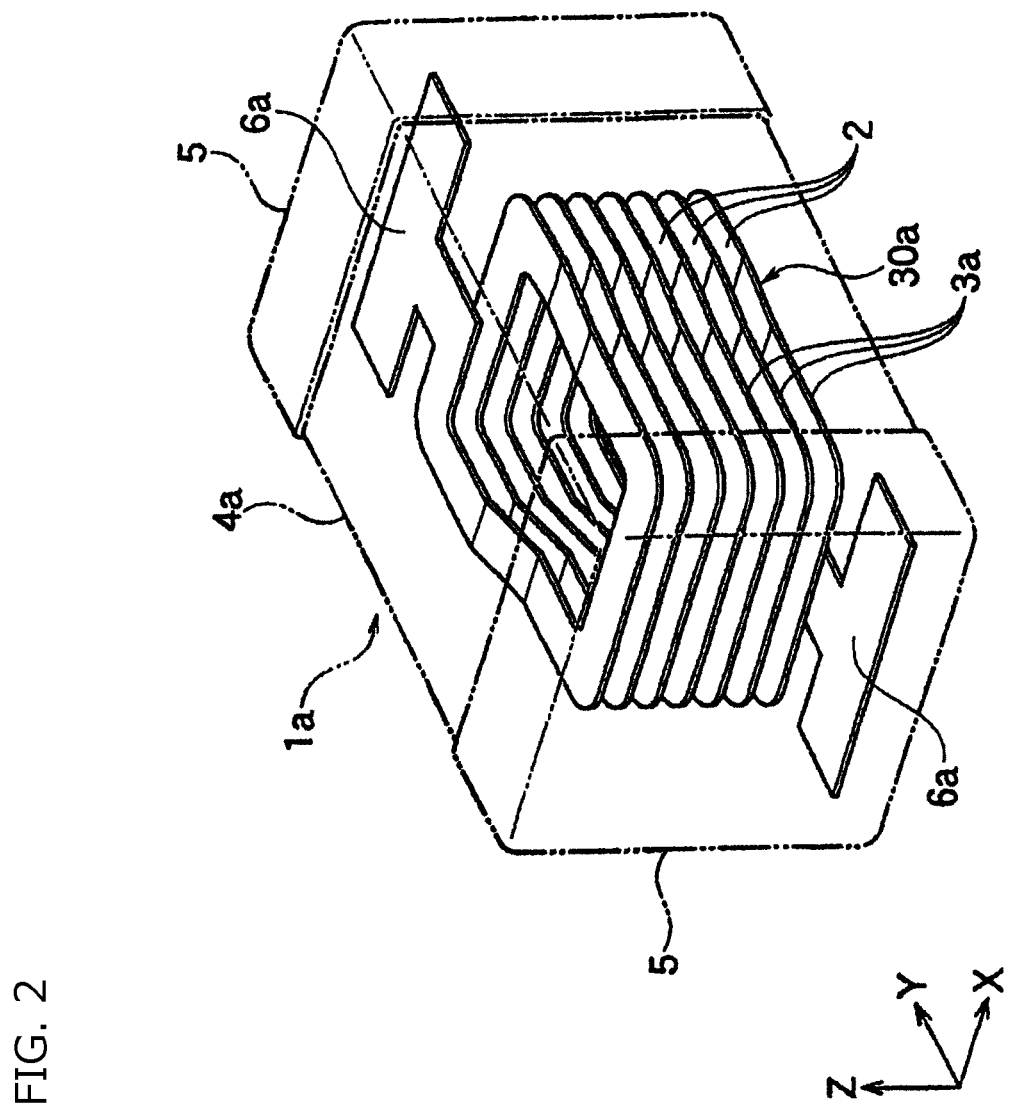
FIG. 2 is an internal perspective view of the multilayer chip coil as an electronic component according to another embodiment of the invention.

For example, the ceramic layer 2 of the multilayer chip coils 1a shown in FIG. 2 may be configured using the ferrite composition of the above-described embodiment. The multilayer chip coil 1a shown in FIG. 2 includes the chip body 4a in which the ceramic layers 2 and the internal electrode layers 3a are alternately laminated in the Z-axis direction.

Each internal electrode layer 3a has a square ring shape, a C shape or an U shape, and is connected in a spiral shape by a through hole electrode (not shown) or a step-formed electrode, those penetrate the adjacent ceramic layer 2 for the internal electrode connection. This configures the coil conductor 30a.

Terminal electrodes 5, 5 are formed on both ends of the chip body 4a in the Y-axis direction. The end portions of the lead-out electrodes 6a positioned above and below in the Z-axis direction are connected to each terminal electrode 5. Each terminal electrode 5, 5 is connected to both ends of the coil conductor 30a, which configures a closed magnetic circuit coil.

In the embodiment, the laminating direction of the ceramic layer 2 and the internal electrode layer 3 coincides with the Z-axis, and the end faces of the terminal electrodes 5, 5 are parallel to the X-axis and the Z-axis. The X, Y and Z axes are perpendicular to one another. In the multilayer chip coil 1a shown in FIG. 2, the winding axis of the coil conductor 30a substantially coincides with the Z-axis.

In the multilayer chip coil 1 shown in FIG. 1, the winding axis of the coil conductor 30 is in the Y-axis direction which is the longitudinal direction of the chip body 4. Thus, it is possible to increase the number of winding turns in comparison with the multilayer chip coil 1a shown in FIG. 2, and that there is an advantage that it is easy to achieve a high impedance up to a high frequency band. According to the multilayer chip coil 1a shown in FIG. 2, the other configuration and operational effects are the same as those of the multilayer chip coil 1 shown in FIG. 1.

Also, the ferrite composition of the embodiment can be used for electronic components other than the multilayer chip coil shown in FIG. 1 or FIG. 2. For example, the ferrite composition of the embodiment can be used as a ceramic layer to be laminated together with a coil conductor. In addition, the ferrite composition of the embodiment can be used in composite electronic components, in which a coil such as an LC composite component and an element such as another capacitor are combined.

Applications of the multilayer chip coil using the ferrite composition of the embodiment are arbitrary. It is also suitably used for a circuit, in which a winding type ferrite inductor has conventionally been used due to a high flow of AC current. An example of the circuit is a circuit of an ICT device (such as a smartphone) adopting NFC technology or non-contact power feeding, etc.

EXAMPLES

Hereinafter, the invention will be explained based on further detailed examples, but the invention is not limited to the following examples.

Experimental Example 1

$Fe_2O_3$, NiO, CuO and ZnO were prepared as raw materials of the main component. $SiO_2$, $Bi_2O_3$, and $Co_3O_4$ were prepared as raw materials of the subcomponents. The average grain size of the starting raw materials was preferably 0.05 to 1.00 μm.

Next, the prepared powder of the raw materials of the main component and that of the raw materials of the subcomponents were weighed so that the sintered body showed the composition shown in Tables 1 to 6.

After weighing, $Fe_2O_3$, NiO, CuO, and optionally a part of ZnO among the prepared raw material of the main component were wet mixed for 16 hours with a ball mill, and a raw material mixture was obtained. In addition, according to the sample No. 5 of Experimental example 1, the content of ZnO in the raw material mixture was set to be 10 mol % or less. That is, the content of ZnO in the calcined material described later was also 10 mol % or less.

Next, the obtained raw material mixture was dried, calcined in air, and obtained the calcined material. The calcination temperature was appropriately selected within the range of 500 to 900° C. according to the composition of the raw material mixture. Thereafter, the remaining ZnO, not mixed in the wet mixing step, and $SiO_2$ were added as a compound of $Zn_2SiO_4$, and ground with a ball mill while adding such as the other subcomponents, and the pulverized calcined material was obtained. In addition, according to the sample No. 5 of Experimental Example 1, the compound of $Zn_2SiO_4$ and ZnO were added to the calcined material, but $SiO_2$ was not added.

The amount of the remaining ZnO added to the calcined material was preferably 1.0 to 3.0 times, with respect to the molar basis, the amount of $SiO_2$ added to the calcined material.

Next, the pulverized calcined material was dried. 10.0 parts by weight of polyvinyl alcohol aqueous solution having 6% weight concentration was then added as a binder to 100 parts by weight of the pulverized calcined material and made granules. The granules were pressed and compacted to obtain a toroidal shape green compact (size=outer diameter 13 mm×inner diameter 6 mm×height 3 mm) and a disk shape green compact (size=outer diameter 12 mm×height 2 mm).

Next, each of these green compact was fired in air for 2 hours at 860 to 900° C. which is the same or lower than the melting point (962° C.) of Ag, and obtained a toroidal core sample and a disc sample as the sintered body. The following property evaluation was performed to each obtained sample. In addition, it was confirmed by a fluorescent X-ray analyzer that the composition hardly changed between the weighed raw material powder and the compact after firing.

Specific Resistance ρ

An In—Ga electrode was applied to both sides of the disk sample, and the DC resistance was measured to determine the resistivity ρ (unit: Ω·m). The measurement was performed using an IR meter (4329A made by HEWLETT PACKARD). In the embodiment, samples having the resistivity of $10^6$ Ω·m or more were determined excellent.

Initial Permeability μi

The copper wire wound around the toroidal core sample for 10 turns, and the initial permeability μi was measured using an LCR meter (4991A made by Agilent Technologies, Inc.). The measurement conditions were a measurement frequency of 1 MHz and a measurement temperature of 25° C. Samples having the initial permeability μi of 3.0 or more were determined excellent.

DC Bias Properties

The copper wire wound around the toroidal core sample for 30 turns and permeability μ when direct current was applied was measured. The permeability μ was measured while changing the applied direct current from 0 to 8 A. The results were shown graphically in which the horizontal axis represented the direct current and the vertical axis represented the permeability. The permeability when applying direct current of 0 A was referred to as the initial permeability μi. Then, the current value at which the permeability decreases by 10% from μi was referred to as Idc.

If the permeability decreases by 10% when applied direct current is 8 A or less, the direct current when the permeability decreases by 10% is referred to as Idc. In the case where the permeability did not decrease by 10% when applied direct current was 8 A, Idc was calculated from the slope of the graph when direct current was 8 A. In this example, it is assumed that the samples showing Idc of 8.0 A or more show excellent DC bias properties.

Density

Density of the sintered ferrite composition was calculated from the size and weight of the sintered body after firing the toroidal core sample. Sinterability was considered excellent when density was 4.70 g/cm$^3$ or more.

Observation of the Ferrite Composition

The ferrite compositions after sintering (the toroidal core samples) were observed by EPMA and STEM-EDS. The observation magnification was set to 20,000 times or more, and the observation magnification suitable for each example and comparative example was appropriately set. It was confirmed whether each ferrite composition includes the main phase including the spinel ferrite phase, the first subphase including the $Zn_2SiO_4$ phase, the second subphase including the $SiO_2$ phase, and the grain boundary phase including the $SiO_2$ phase. Furthermore, the area ratio of the main phase, the first subphase, the second subphase, and the grain boundary phase were calculated from the observation results of STEM-EDS. In each examples in Tables 1 to 6, the area of the first subphase was 4% or more and 15% or less, the area of the second subphase was 1% or more and 10% or less, the area of the main phase was 75% or more to 95% or less, and the area of the grain boundary phase was 5% or more to 25% or less.

Content of $Zn_2SiO_4$

Content of $Zn_2SiO_4$ was examined by measuring $I_B/I_A$ of the sintered ferrite composition by an X-ray diffractometer (X'Pert PRO MPD CuKα ray made by Panalytical, Inc.).

AC Resistance

AC resistance (Rac) was measured by the followings. The copper wire wound around the toroidal core sample for 6 turns on the primary side and 3 turns on the secondary side. B-H analyzer (SY-8218 made by IWATSU TEST INSTRUMENTS Ltd.) and an amplifier (4101-IW made by NF circuit design block) were used and the frequency at the time of measurement was 3 MHz and the alternating current value was 1.6 Arms. Samples showing the alternating current resistance: Rac of 25 mΩ or less were determined excellent.

TABLE 1

| No | Ex. or Comp. Ex. | Main component (mol %) | | | | Subcomponent (parts by weight) | | | Co3O4/SiO2 (weight ratio) | Idc (A) | ρ (Ωm) | Density (g/cm3) | μi | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 1 | Comp. Ex. | 44.0 | 33.5 | 7.5 | 15.0 | 5.8 | 3.4 | 1.8 | 1.7 | 10.2 | 1.4.E+08 | 4.89 | 2.9 | 16.6 | 0.059 |
| 2 | Ex. | 44.1 | 33.4 | 7.5 | 15.0 | 5.8 | 3.4 | 1.8 | 1.7 | 10.1 | 1.3.E+08 | 4.86 | 3.0 | 16.7 | 0.058 |
| 3 | Ex. | 45.2 | 32.3 | 7.5 | 15.0 | 5.8 | 3.4 | 1.8 | 1.7 | 9.4 | 5.0.E+07 | 4.91 | 3.3 | 17.8 | 0.053 |
| 4 | Ex | 46.0 | 31.5 | 7.5 | 15.0 | 5.8 | 3.4 | 1.8 | 1.7 | 8.9 | 4.7.E+07 | 4.88 | 3.7 | 18.5 | 0.050 |
| 5 | Ex | 48.1 | 29.4 | 7.5 | 15.0 | 5.8 | 3.4 | 1.8 | 1.7 | 8.5 | 4.5.E+06 | 4.83 | 4.2 | 19.1 | 0.040 |
| 6 | Ex | 49.2 | 28.3 | 7.5 | 15.0 | 5.8 | 3.4 | 1.8 | 1.7 | 8.3 | 4.4.E+06 | 4.85 | 4.6 | 19.4 | 0.035 |
| 7 | Ex. | 50.0 | 27.5 | 7.5 | 15.0 | 5.8 | 3.4 | 1.8 | 1.7 | 8.1 | 1.3.E+06 | 4.80 | 5.1 | 19.7 | 0.031 |
| 7a | Comp. Ex. | 51.1 | 26.4 | 7.5 | 15.0 | 5.8 | 3.4 | 1.8 | 1.7 | 6.4 | 5.1.E+04 | 4.51 | 3.9 | 21.9 | 0.015 |

TABLE 2

| No | Ex. or Comp. Ex. | Main component (mol %) | | | | Subcomponent (parts by weight) | | | Co3O4/SiO2 (weight ratio) | Idc (A) | ρ (Ωm) | Density (g/cm3) | μi | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 8 | Comp. Ex. | 48.1 | 40.0 | 7.5 | 4.4 | 5.8 | 3.4 | 1.8 | 1.7 | 10.2 | 4.6.E+07 | 4.79 | 2.9 | 17.6 | 0.010 |
| 12 | Ex. | 48.1 | 39.9 | 7.5 | 4.5 | 5.8 | 3.4 | 1.8 | 1.7 | 9.8 | 9.6.E+06 | 4.91 | 3.2 | 18.2 | 0.009 |
| 5 | Ex. | 48.1 | 29.4 | 7.5 | 15.0 | 5.8 | 3.4 | 1.8 | 1.7 | 8.5 | 4.5.E+06 | 4.83 | 4.2 | 19.1 | 0.040 |
| 13 | Ex. | 48.1 | 19.4 | 7.5 | 25.0 | 5.8 | 6.9 | 1.8 | 0.5 | 9.0 | 4.6.E+08 | 4.83 | 5.2 | 19.0 | 0.086 |
| 13a | Ex. | 48.1 | 5.4 | 7.5 | 39.0 | 5.8 | 6.9 | 1.8 | 0.5 | 9.0 | 4.6.E+08 | 4.83 | 5.2 | 19.0 | 0.086 |

TABLE 3

| No | Ex. or Comp. Ex. | Main component (mol %) | | | | Subcomponent (parts by weight) | | | Co3O4/SiO2 (weight ratio) | Idc (A) | ρ (Ωm) | Density (g/cm3) | μi | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 10a | Comp. Ex. | 48.1 | 31.9 | 5.0 | 15.0 | 5.8 | 3.4 | 1.8 | 1.7 | 8.9 | 9.1.E+04 | 4.61 | 2.9 | 17.7 | 0.035 |
| 10 | Ex. | 48.1 | 31.4 | 5.5 | 15.0 | 5.8 | 3.4 | 1.8 | 1.7 | 9.1 | 1.3.E+06 | 4.75 | 4.0 | 18.2 | 0.039 |
| 5 | Ex. | 48.1 | 29.4 | 7.5 | 15.0 | 5.8 | 3.4 | 1.8 | 1.7 | 8.5 | 4.5.E+06 | 4.83 | 4.2 | 19.1 | 0.040 |
| 11 | Ex. | 48.1 | 22.9 | 14.0 | 15.0 | 5.8 | 3.4 | 1.8 | 1.7 | 8.1 | 2.7.E+06 | 4.88 | 4.9 | 19.9 | 0.041 |
| 11a | Comp. Ex. | 48.1 | 21.9 | 15.0 | 15.0 | 5.8 | 3.4 | 1.8 | 1.7 | 6.9 | 4.1.E+05 | 4.90 | 5.1 | 20.5 | 0.045 |

TABLE 4

| No | Ex. or Comp. Ex. | Main component (mol %) | | | | Subcomponent (parts by weight) | | | Co3O4/SiO2 (weight ratio) | Idc (A) | ρ (Ωm) | Density (g/cm3) | μi | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 14a | Comp. Ex. | 48.1 | 29.4 | 7.5 | 15.0 | 5.8 | 3.0 | 1.8 | 1.9 | 7.9 | 3.5.E+06 | 4.85 | 5.0 | 20.5 | 0.034 |
| 14 | Ex. | 48.1 | 29.4 | 7.5 | 15.0 | 5.8 | 3.1 | 1.8 | 1.9 | 8.1 | 4.5.E+06 | 4.84 | 4.9 | 19.7 | 0.036 |
| 5 | Ex. | 48.1 | 29.4 | 7.5 | 15.0 | 5.8 | 3.4 | 1.8 | 1.7 | 8.5 | 4.5.E+06 | 4.83 | 4.2 | 19.1 | 0.040 |
| 15 | Ex. | 48.1 | 29.4 | 7.5 | 15.0 | 5.8 | 5.0 | 1.8 | 1.2 | 9.5 | 4.6.E+06 | 4.79 | 4.0 | 17.6 | 0.061 |
| 16 | Ex. | 48.1 | 29.4 | 7.5 | 15.0 | 5.8 | 8.0 | 1.8 | 0.7 | 10.0 | 5.1.E+06 | 4.79 | 3.7 | 16.9 | 0.089 |
| 17 | Ex. | 48.1 | 29.4 | 7.5 | 15.0 | 5.8 | 11.0 | 1.8 | 0.5 | 11.0 | 5.4.E+06 | 4.70 | 3.4 | 15.4 | 0.107 |
| 18 | Ex. | 48.1 | 29.4 | 7.5 | 15.0 | 5.8 | 13.0 | 1.8 | 0.4 | 12.0 | 5.3.E+06 | 4.71 | 3.0 | 14.0 | 0.132 |
| 18a | Comp. Ex. | 48.1 | 29.4 | 7.5 | 15.0 | 5.8 | 14.1 | 1.8 | 0.4 | 13.5 | 7.5.E+06 | 4.65 | 2.7 | 13.6 | 0.157 |

TABLE 5

| No | Ex. or Comp. Ex. | Main component (mol %) | | | | Subcomponent (parts by weight) | | | Co3O4/SiO2 (weight ratio) | Idc (A) | ρ (Ωm) | Density (g/cm3) | μi | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 19a | Comp. Ex. | 48.1 | 29.4 | 7.5 | 15.0 | 2.0 | 3.4 | 1.8 | 0.6 | 7.9 | 5.5.E+06 | 4.92 | 12.3 | 20.1 | 0.043 |
| 19 | Ex. | 48.1 | 29.4 | 7.5 | 15.0 | 2.1 | 3.4 | 1.8 | 0.6 | 8.0 | 5.0.E+06 | 4.92 | 12.0 | 19.8 | 0.042 |
| 20 | Ex. | 48.1 | 29.4 | 7.5 | 15.0 | 3.0 | 3.4 | 1.8 | 0.9 | 8.4 | 5.2.E+06 | 4.83 | 8.0 | 19.5 | 0.044 |
| 5 | Ex. | 48.1 | 29.4 | 7.5 | 15.0 | 5.8 | 3.4 | 1.8 | 1.7 | 8.5 | 4.5.E+06 | 4.83 | 4.2 | 19.1 | 0.040 |
| 21 | Ex. | 48.1 | 29.4 | 7.5 | 15.0 | 8.0 | 3.4 | 1.8 | 2.4 | 9.2 | 5.4.E+06 | 4.90 | 3.5 | 18.6 | 0.037 |
| 22 | Ex. | 48.1 | 29.4 | 7.5 | 15.0 | 10.0 | 3.4 | 1.8 | 1.9 | 9.8 | 4.7.E+06 | 4.86 | 3.0 | 18.1 | 0.042 |
| 22a | Comp. Ex. | 48.1 | 29.4 | 7.5 | 15.0 | 11.0 | 3.4 | 1.8 | 3.2 | 10.1 | 4.6.E+06 | 4.82 | 2.8 | 17.7 | 0.039 |
| 22b | Comp. Ex. | 48.1 | 29.4 | 7.5 | 15.0 | 11.0 | 3.7 | 1.8 | 3.0 | 10.2 | 2.4.E+06 | 4.80 | 2.6 | 17.5 | 0.038 |

TABLE 6

| No | Ex. or Comp. Ex. | Main component (mol %) | | | | Subcomponent (parts by weight) | | | Co3O4/SiO2 (weight ratio) | Idc (A) | ρ (Ωm) | Density (g/cm3) | μi | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 23a | Comp. Ex. | 48.1 | 29.4 | 7.5 | 15.0 | 5.8 | 3.4 | 0.10 | 1.7 | 9.0 | 7.5.E+05 | 4.55 | 2.5 | 17.7 | 0.020 |
| 23 | Ex. | 48.1 | 29.4 | 7.5 | 15.0 | 5.8 | 3.4 | 0.25 | 1.7 | 8.9 | 1.5.E+06 | 4.70 | 3.8 | 18.5 | 0.042 |
| 5 | Ex. | 48.1 | 29.4 | 7.5 | 15.0 | 5.8 | 3.4 | 1.8 | 1.7 | 8.5 | 4.5.E+06 | 4.83 | 4.2 | 19.1 | 0.040 |
| 24 | Ex. | 48.1 | 29.4 | 7.5 | 15.0 | 5.8 | 3.4 | 5.0 | 1.7 | 8.2 | 1.7.E+06 | 4.90 | 4.6 | 19.5 | 0.041 |
| 24a | Comp. Ex. | 48.1 | 29.4 | 7.5 | 15.0 | 5.8 | 3.4 | 7.0 | 1.7 | 5.9 | 5.7.E+05 | 4.92 | 4.7 | 24.3 | 0.040 |

The content of $Fe_2O_3$ and the content of NiO were mainly changed in Table 1. The samples, in which all the main components and the subcomponents were within the predetermined range, were excellent in all the properties. In contrast, the sample No. 1 including an excessively small content of $Fe_2O_3$ resulted in an excessively low initial permeability μi. Moreover, the sample No. 7a including an excessively large content of $Fe_2O_3$ resulted in a deterioration in the sinterability, a deterioration in the DC bias properties, an excessively low resistivity ρ, and an excessively high AC resistance: Rac.

The contents of ZnO and NiO were mainly changed in Table 2. The samples, in which all the main components and the subcomponents were within the predetermined range, were excellent in all the properties. In contrast, the sample No. 8 including an excessively large content of NiO resulted in an excessively low initial permeability μi.

The contents of CuO and NiO were mainly changed in Table 3. The samples, in which all the main components and the subcomponents were within the predetermined range, were excellent in all the properties. In contrast, the sample No. 10a including an excessively small content of CuO resulted in a deterioration in the sinterability, an excessively low resistivity ρ, and an excessively low initial permeability μi. The sample No. 11a including an excessively large content of CuO resulted in deteriorated DC bias properties, an excessively low resistivity ρ, and an excessively high AC resistance: Rac.

The content of $SiO_2$ is mainly changed in Table 4. The samples, in which all the main components and the subcomponents were within the predetermined range, were excellent in all the properties. In contrast, the sample No. 14a including an excessively small content of $SiO_2$ resulted in deteriorated DC bias properties and an excessively high AC resistance: Rac. The sample No. 18a including an excessively large content of $SiO_2$ resulted in a deterioration in the sinterability and an excessively low initial permeability μi.

The content of $Co_3O_4$ is mainly changed in Table 5. The samples, in which all the main components and the subcomponents were within the predetermined range, were excellent in all the properties. In contrast, the sample No. 19a including an excessively small content of $Co_3O_4$ resulted in deteriorated DC bias properties and an excessively high AC resistance: Rac. The sample No. 22a, including an excessively large content of $SiO_2$ and shows excessively large Co/Si, resulted in an excessively low initial permeability μi. The sample No. 22b, including an excessively large content of $Co_3O_4$ resulted in an excessively low initial permeability μi.

The content of $Bi_2O_3$ is mainly changed in Table 6. The samples, in which all the main components and the subcomponents were within the predetermined range, were excellent in all the properties. In contrast, the sample No. 23a including an excessively small content of $Bi_2O_3$ resulted in a deterioration in the sinterability, an excessively low resistivity ρ, and an excessively low initial permeability μi. The sample No. 24a including an excessively large content of $Bi_2O_3$ resulted in an excessively low resistivity ρ, deteriorated DC bias properties, and an excessively high AC resistance: Rac.

Experimental Example 2

According to Experimental Example 2, the composition was not changed, while the composition of the raw material mixture and the types and/or addition amounts of additives to be added after calcination were changed from the sample No. 5 of the experimental example 1. Thus, area ratio of the main phase, the first subphase, the second subphase, and the grain boundary phase were varied. The results are shown in Table 7.

According to the sample No. 5a and No. 5e, the content of ZnO in the raw material mixture was increased compared to the same of sample No. 5. And $SiO_2$, and, ZnO when necessary, were added to the calcined material. No compound of $Zn_2SiO_4$ was added. In addition, the content of ZnO in the raw material mixture was more than 10 mol %.

According to the sample No. 5c, the content of ZnO in the raw material mixture was increased compared to the same of sample No. 5. Compound of $Zn_2SiO_4$, $SiO_2$, and, ZnO when necessary, were added to the calcined material. In addition, the content of ZnO in the raw material mixture is 10 mol % or less.

According to the sample No. 5d, $SiO_2$ and ZnO were added instead of the compound of $Zn_2SiO_4$ added to the calcined material of No. 5. In addition, content of ZnO in the raw material mixture was 10 mol % or less.

According to the sample No. 5g, the content of ZnO in the raw material mixture was increased compared to the same of sample No. 5. And $Zn_2SiO_4$ compound and $SiO_2$ were added to the calcined material. In addition, the content of ZnO in the raw material mixture was more than 10 mol %.

TABLE 7

| No | Ex. or Comp. Ex. | Area ratio (%) | | | | Total of subphases | Idc (A) | ρ (Ωm) | Density (g/cm3) | μi | Rac (mΩ) | IB/IA |
|---|---|---|---|---|---|---|---|---|---|---|---|---|
| | | Main phase | The first subphase | The second subphase | Grain boundary phase | | | | | | | |
| 5 | Ex. | 81.53 | 6.95 | 2.33 | 9.19 | 9.28 | 8.5 | 4.5.E+06 | 4.83 | 4.2 | 19.1 | 0.040 |
| 5a | Ex. | 81.95 | 1.05 | 15.98 | 1.02 | 17.03 | 7.0 | 8.1.E+06 | 4.84 | 4.2 | 19.8 | 0.039 |
| 5c | Ex. | 75.73 | 7.00 | 2.46 | 14.81 | 9.46 | 10.6 | 5.1.E+06 | 4.72 | 3.2 | 17.1 | 0.040 |
| 5d | Ex. | 81.10 | 1.10 | 9.43 | 8.37 | 10.53 | 8.0 | 6.8.E+06 | 4.82 | 4.1 | 19.2 | 0.038 |
| 5e | Ex. | 79.91 | 4.89 | 10.00 | 5.20 | 14.89 | 8.8 | 3.5.E+06 | 4.72 | 4.0 | 18.9 | 0.028 |
| 5g | Ex. | 74.18 | 14.80 | 9.99 | 1.03 | 24.79 | 10.8 | 3.7.E+06 | 4.70 | 3.1 | 17.1 | 0.085 |

Table 7 shows that preferable results could be obtained even when area ratio of the main phase, the first subphase, the second subphase, and the grain boundary phase varied. In particular, as the area ratio of the first subphase including $Zn_2SiO_4$ is higher, the inductance properties tended to be improved, and the DC bias properties and the AC resistance: Rac also tended to be better. Furthermore, as the area ratio of the grain boundary phase including $Bi_2O_3$ and $SiO_2$ is higher, the inductance properties were improved, and the DC bias properties and the AC resistance: Rac also tended to be better.

DESCRIPTION OF THE REFERENCE NUMERAL 1, 1a . . . multilayer chip coil
2 . . . ceramic layer
3, 3a . . . inner electrode layer
4, 4a . . . chip body
5 . . . terminal electrode
6 . . . through-hole electrode for terminal connection
6a . . . lead-out electrode
11 . . . ferrite composition
12 . . . main phase (spinel ferrite phase)
14 . . . subphase (low a phase)
14a . . . the first subphase ($Zn_2SiO_4$ phase)
14b . . . the second subphase ($SiO_2$ phase)
16 . . . grain boundary phase ($Bi_2O_3$ phase, $SiO_2$ phase)
30, 30a . . . coil conductor

What is claimed is:

1. A ferrite composition comprising a main component and a subcomponent, wherein
the main component comprises 44.1 mol % or more to 50.0 mol % or less of an Fe compound in terms of $Fe_2O_3$, 5.5 mol % or more to 14.0 mol % or less of a Cu compound in terms of CuO, 4.5 mol % or more to 39.0 mol % or less of a Zn compound in terms of ZnO, and a balance which is 5.4 mol % or more to 39.9 mol % or less of a Ni compound in terms of NiO,
the subcomponent, with respect to 100 parts by weight of the main component, comprises 3.1 parts by weight or more to 13.0 parts by weight or less of an Si compound in terms of $SiO_2$, 2.1 parts by weight or more to 10.0 parts by weight or less of a Co compound in terms of $Co_3O_4$, and 0.25 parts by weight or more to 5.00 parts by weight or less of a Bi compound in terms of $Bi_2O_3$, and
a weight ratio of the content of the Co compound in terms of $Co_3O_4$ to the content of the Si compound in terms of $SiO_2$ is 0.4 to 2.9.

2. The ferrite composition according to claim 1 comprising 3.0 parts by weight or more to 8.0 parts by weight or less of the Co compound in terms of $Co_3O_4$.

3. The ferrite composition according to claim 1 comprising 1.00 parts by weight or more to 4.00 parts by weight or less of the Bi compound in terms of $Bi_2O_3$.

4. The ferrite composition according to claim 2 comprising 1.00 parts by weight or more to 4.00 parts by weight or less of the Bi compound in terms of $Bi_2O_3$.

5. The ferrite composition according to claim 1, wherein the weight ratio of the content of the Co compound in terms of $Co_3O_4$ to the content of the Si compound in terms of $SiO_2$ is 1.0 or more to 2.5 or less.

6. The ferrite composition according to claim 2, wherein the weight ratio of the content of the Co compound in terms of $Co_3O_4$ to the content of the Si compound in terms of $SiO_2$ is 1.0 or more to 2.5 or less.

7. The ferrite composition according to claim 3, wherein the weight ratio of the content of the Co compound in terms of $Co_3O_4$ to the content of the Si compound in terms of $SiO_2$ is 1.0 or more to 2.5 or less.

8. The ferrite composition according to claim 4, wherein the weight ratio of the content of the Co compound in terms of $Co_3O_4$ to the content of the Si compound in terms of $SiO_2$ is 1.0 or more to 2.5 or less.

9. The ferrite composition according to claim 1 comprising
a main phase comprising a spinel ferrite,
a first subphase comprising a $Zn_2SiO_4$ phase, and
a grain boundary phase comprising an $SiO_2$ phase.

10. The ferrite composition according to claim 9 further comprising a second subphase comprising an $SiO_2$ phase.

11. The ferrite composition according to claim 10, wherein
an area of the first subphase is 1% or more and 32% or less,
an area of the second subphase is 1% or more and 16% or less,
an area of the main phase is 66% or more and 82% or less, and
an area of the grain boundary phase is 1% or more and 15% or less,
when a total area of the main phase, the first subphase, the second subphase, and the grain boundary phase is 100%.

12. A multilayer electronic component composed by laminating a coil conductor and a ceramic layer, wherein the ceramic layer comprises the ferrite composition according to claim 1.

13. The ferrite composition according to claim 1, which has a resistivity ρ of $10^6$ Ω·m or more.

14. The ferrite composition according to claim 1, which has an initial permeability μi of 3.0 or more.

15. The ferrite composition according to claim 1, which has an Idc of 8.0 A or more.

16. The ferrite composition according to claim 1, which has a density of 4.70 g/cm$^3$ or more.

17. The ferrite composition according to claim 1, which has an alternating current resistance (Rac) of 19.9 mΩ or less.

* * * * *